Aug. 12, 1969   F. W. R. STARP ET AL   3,460,454
PHOTOGRAPHIC SELF-WINDING SHUTTER
Filed Dec. 19, 1966
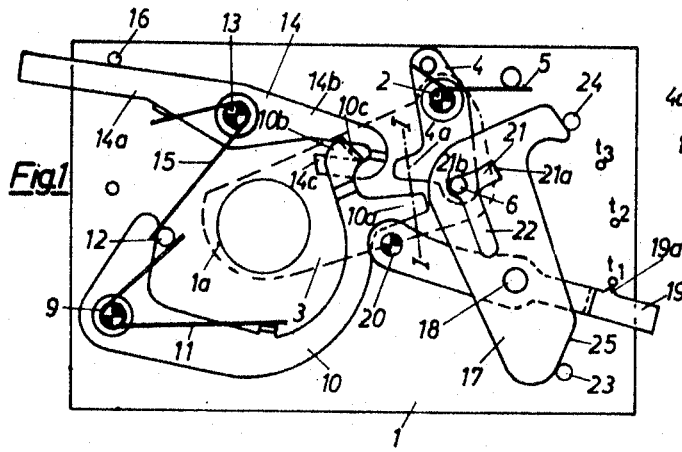
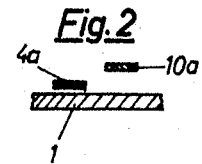
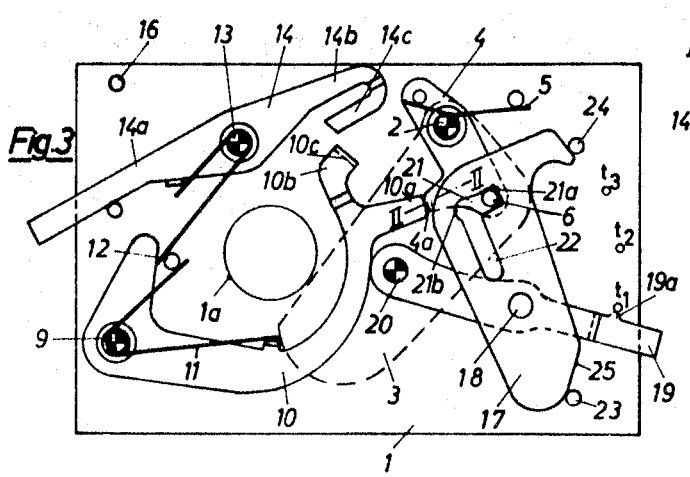
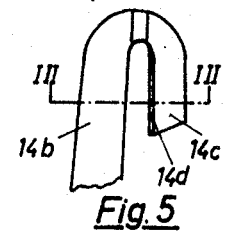
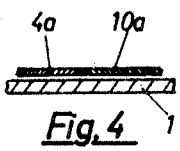
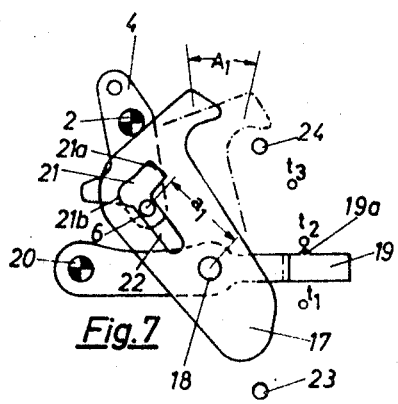
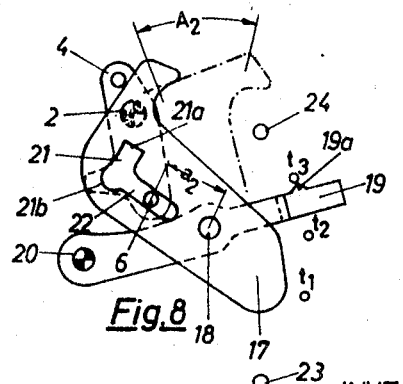
INVENTORS
Franz W. R. Starp,
Carl Richter,
Eugen Erhard
BY Arthur A. March
ATTORNEY United States Patent Office
3,460,454
Patented Aug. 12, 1969

3,460,454
PHOTOGRAPHIC SELF-WINDING SHUTTER
Franz W. R. Starp, Carl Fritz Richter, and Eugen Adolf Erhard, Calmbach, Germany, assignors to Prontor-Werk Alfred Gauthier G.m.b.H., Calmbach, Black Forest, Germany, a corporation of Germany
Filed Dec. 19, 1966, Ser. No. 602,972
Claims priority, application Germany, Dec. 18, 1965, P 38,382
Int. Cl. G03b 9/14
U.S. Cl. 95—62    11 Claims

ABSTRACT OF THE DISCLOSURE

A photographic self-winding shutter that has a braking weight connected to the shutter actuator. This braking weight is mounted on a movable carrier so that it can be adjusted. This adjustment shifts the center of gravity of the braking weight so as to allow the braking weight to swing out different distances. By varying the swing out distance the shutter speed is thereby controlled.

---

The invention relates to a photographic self-winding shutter with an actuating lever which moves back and forth and provides the opening and shutting motion of the shutter blade system.

Photographic self-winding shutters of the above type which are relatively simple in design are known. However, while it was possible to find usable solutions for such shutter arrangements resulting in a considerable simplification of the shutter drive mechanism in both structural and functional aspects, one had to rely heretofore on building into such shutter arrangements braking devices which, compared to the simple design of the shutter, required components of disproportionately high cost.

It is an object of this invention to eliminate this disadvantage by providing a photographic self-winding shutter having a braking device serving to form the exposure time which is simple in structural as well as functional aspects to the same degree as the drive mechanism for the shutter blade system.

It has now been found that the foregoing objects and other advantages can be readily attained according to this invention by providing a braking weight, pivoted on a movably arranged support, and cooperating with the sector actuating lever so as to be engageable and disengageable therewith. It is thus possible according to this invention to provide a braking device for simple photographic self-winding shutters with a minimum of means and simple construction which has not only the prerequisites for exact exposure time regulation but, beyond this, furnishes the possibility of time regulation within relatively wide limits.

A braking device, particularly favorable from a functional viewpoint and fully meeting the objects of this invention, is provided according to an embodiment of this invention having a braking weight carrier that is movably arranged with regard to the actuating lever, so that wtih the approach of the fulcrum point of the braking weight, the swing-out distance of the braking weight is increased inversely proportional to the approach of the fulcrum point to the pivot point of the braking weight.

A particularly advantageous, simple and functionally reliable design of the device according to the invention results from having the freely movable end of the sector actuating lever carrying a clutch pin and providing the part of the braking weight facing it with a rocker arm which may be in the form of a slot in the braking weight. The advantage of this arrangement is due to the relatively simple type of enclosing the clutch connection between the sector actuating lever and the braking weight.

To achieve an extremely short exposure time having an exposure duration of a considerably shorter time interval than the length of time achievable when it is necessary to disengage the braking weight, this invention further provides that the braking weight may have a recess or slot which matches the course of travel of the clutch pin, and wherein the recess has one limiting edge of straight line design which serves as reflex stop. For this purpose, it is expedient to assign fixed stops to the braking weight which serve to guide the weight and have it make snug contact when bringing it into the setting position, so that the straight-lined limiting edge of the recess is effective as reflex stop.

Various other objects, features and advantages of this invention will be apparent from the following specification, claims and the drawings appended hereto wherein:

FIGURE 1 is an overall view of the shutter illustrated with the winding and release mechanism in starting position and with the time setting member set to the shortest possible exposure time $t_1$.

FIGURE 2 is a cross-sectional view along line I—I of FIGURE 1.

FIGURE 3 is a view similar to FIGURE 1 illustrating the shutter arrangement after actuation of the winding and release mechanism with shutter blade system in open position.

FIGURE 4 is a cross-sectional view along line II—II of FIGURE 3.

FIGURE 5 is an enlarged fragmentary view of the hook-shaped end of the winding and release lever that cooperates with the drive lever.

FIGURE 6 is a cross-sectional view along line III—III of FIGURE 5.

FIGURE 7 is a partial view illustrating the braking device whereby a longer exposure $t_2$ is set, the braking weight being shown in full lines in its normal position and in phantom line in its reversal position.

FIGURE 8 is a view similar to FIGURE 7 with the braking device set to the longest time $t_3$.

Referring now in detail to the drawings, there is illustrated an embodiment of the self-winding shutter of this invention having a plate, designated by the reference numeral 1, which is one of two plates separated from each other by a narrow interspace, both of which have a shutter opening 1a. Rotatably supported on these two plates is a pin 2 mounting a sector or shutter blade 3 which is freely movable in the interspace. Also mounted on the pin 2 is an actuating lever 4 connected so as to corotate with the shutter blade 3 and to provide the opening and shutting motion of the shutter blade system. For this purpose, the rotating pin 2 protrudes far enough beyond the upper side surface of plate 1 so that the actuating lever 4 can be attached for coaxial rotation. The sector actuating lever 4 is engaged by winding spring 5 fixed relative to the plate 1 which exerts a constant clockwise turning moment on the lever 4. The freely movable end of the sector actuating lever 4 carries a clutch pin 6, and one of its lateral edges is provided with a knob-like protruberance 4a the function of which will be explained hereinafter.

As may be seen from FIGURES 1 and 3, a drive lever 10, pivotable on a fixed pin 9 and biased toward a stop 12 by the action of a drive spring 11, is provided for cooperation with the sector actuating lever 4. The drive lever 10 is configured to be disposed partially around the shutter opening 1a and has a catch 10a which cooperates with the sector actuating lever 4 to open sector 3 in a manner which will be described hereinafter in greater detail. The end 10b of drive lever 10 is configured to be offset toward one side so that it positions itself at a certain distance above plate 1. In addition, this end 10b is provided with a downwardly bent tab 10c having an edge facing the plate 1 which rises obliquely.

To bring the drive lever 10 into the wound position, a winding and release lever 14, illustrated as a two arm design in the disclosed embodiment, is pivoted on a fixed pin 13 and has a return spring 15 to keep it in contact with a stop pin 16. The arm 14a of the winding and release lever 14 serves to actuate the shutter and the arm 14b is engageable with the drive lever 10 in the normal position of the shutter as well as during the winding process. For this purpose, the lever arm 14b has a hook-shaped part 14c with a bent end, illustrated in the cross-sectional view of FIGURE 6, which is configured to rise at a slight angle from the plane of motion of lever 14 and plate 1. The mountings of both levers 10 and 14 are so chosen that their mutually engagable ends are relatively movable during the winding process in such a way that the drive lever 10 automatically slides off the lever 14 after the latter has traversed a certain distance during the winding and releasing process so that a certain amount of winding moment is imparted to the drive spring 11.

To be able to take snap-shot pictures with different exposure times with the above described shutter arrangement which is relatively simple in construction and operation, a braking weight 17 can be connected to the sector actuating lever 4. For this purpose, the braking weight 17 is mounted by means of a hinge pin 18 so as to be turnable on a movable support in the form of a setting lever 19 serving to set the exposure time. The time setting lever 19, as illustrated in the disclosed embodiment, is designed as a one-armed lever pivoted on a fixed pivot pin 20. The lever 19 bears a pointer mark 19a and is settable thereby to three positions marked $t_1$, $t_2$, and $t_3$.

As may be seen from the drawing, the braking weight 17 has a slot or recess 21 configured to match the course of motion of the clutch pin 6. The recess 21 has two limiting edges 21a and 21b and is so designed that an unimpeded run-off of the sector actuating lever 4 is assured when the clutch pin 6 moves within the area of the recess 21. In addition to the recess 21 another slot 22 is provided in the braking weight 17 in the form of extending from the recess 21 and oriented radially toward the pivot point 18 of setting lever 19 to provide an enclosing connection of braking weight 17 to the sector actuating lever 4.

Depending on the relative position of time setting lever 19, the clutch pin 6 is either, as shown in FIGURES 1 and 3, freely movable within the area of recess 21 or else it is engagingly disposed, as illustrated in FIGURES 7 and 8 in the slot formed by the rocker arm 22 of the braking weight 17. A braking influence is exerted on the run-off motion of the sector actuating lever 4 by the addition of the braking weight 17, and this effect can be increased, as illustrated in FIGURE 8, in that the relative distance $a_1$ of the clutch pin 6 to the pivot point 18 of the braking weight 17 on the lever arm 19 is reduced to the relative distance $a_2$. This, in turn, results in an inversely proportional increase of the swing-out distance $A_1$ of the braking weight 17 to an amplitude of $A_2$ which provides a prolongation of the exposure time during the shutter run-off.

Accordingly, when the time setting lever 19 is in the setting $t_1$, the shortest possible exposure time is provided. In the setting $t_2$ a prolonged exposure time due to the influence of the braking weight 17 is set and finally, in the setting $t_3$, the longest possible exposure time is achievable by reducing the effective leverage on the braking weight 17 during the shutter run-off by moving the pivot point 18 to decrease the distance $a_1$ to $a_2$.

As may further be seen from FIGURES 1 and 3, fixed stops 23 and 24 are assigned to braking weight 17. The pin 23 has the job of causing the braking weight 17 to contact with the fixed stop 24 when time setting lever 19 is brought into setting $t_1$. The purpose of the stop 24 is to hold the braking weight 17 in a fixed position so that it can act as strike surface during the shutter run-off. For this purpose, a guide edge 25 is provided on the braking weight 17 to influence its position during the setting process. Recess 21 is so shaped with respect to the path of travel of clutch pin 6 so that the pin is assured to strike against the straight-lines limiting edge 21a of the recess 21 during the reversal phase of sector actuating lever 4 so that the pin 6 is repelled by the edge 21a of the braking weight 17.

The action of the shutter arrangement and braking device is described in detail as follows:

When the winding and release lever 14a is actuated after the time setting lever 19 has first been set to the shortest exposure time $t_1$, as illustrated in FIGURES 1 and 3, the hook-shaped part 14c moves counterclockwise, whereby the drive lever 10, due to the engagement of its tab 10c with the bent end 14c, is moved along in the same rotational direction thereby increasing the tension of drive spring 11. Because the drive lever 10 has its end 10b engaged against the upwardly positioned engagement edge 14d of the angled-off winding lever end 14a during the winding process, the driving arm 10a is led over the sector actuating lever 4 without touching it during this process, while the two cooperating lever ends 10b and 14b shift with respect to each other.

After reaching the wound position, the tab 10c of the drive lever 10 leaves the part 14c of the winding and release lever 14 due to the relative motion of the two lever ends, enabling the drive lever 10 to spring back in a direction toward the plate 1 and, at the same time, to run off clockwise under the effect of the drive spring 11. Since the catch tab 10a is now in the same plane of motion as the knob-like part 4a of the sector actuating lever 4, the latter is turned counterclockwise. This same motion is imparted to the sector 2 thereby changing it from the closed into the open position, whereby the clutch pin 6 strikes against the straight lined reflex edge 21a of the recess 21.

When the open position is attained, the drive lever 10 has disengaged from the sector actuating lever 4. The lever 4 now returns, reversing its direction under the influence of the preloaded closing spring 5, thereby moving the sector 2 into the closed position without retardation in time, while the drive lever 10 returns into its starting position determined by the stop 12. After this, when the lever 14 is released, it returns into its starting position under the influence of the return spring 15, so that the bent and oblique lever end 14c of the winding and release lever 14 positions itself like a wedge under the free end 10b of the drive lever 10 and lifts it so that the drive arm 10a again positions itself above the plane of motion of the sector actuating lever 4. At the end of the return motion, the tab 10c of the drive lever 10 engages the bent portion 14c, thereby preparing the shutter for the next winding process.

If it is desired to take a picture with the exposure time $t_2$, the pointer mark 19a of the time setting lever 19 should be brought into the setting $t_2$. During this process, the braking weight 17 has its pivot point 18 shifted relative to the clutch pin 6 so that the pin 6 is engagingly disposed in the slot formed by the rocker arm 22 of the braking weight 17. Due to the addition of the braking weight 17 to the actuating lever 4 serving to drive the sector 2, the run-off motion of the actuating lever 4 is retarded in the above described case because the mass of the braking weight must be moved in both the opening and closing process and must consequently be accelerated twice from zero to a maximum value.

By moving the pivot point 18 of the braking weight 17 closer to the clutch pin 6, which is done when the pointer mark 19a of the time setting lever 19 is set to the setting $t_3$, the longest exposure time is achievable. Accordingly, by reducing the effective leverage of the driving force to the distance $a_2$, the amplitude of the braking weight 17 experiences a change to $A_2$ in the reverse order of magnitude. Increasing the amplitude to the angular distance $A_2$ causes a prolongation of the exposure time during the run-off of the shutter.

It will be understood that the foregoing description with the details of exemplary structure is not to be construed in any way to limit the invention, but that modifications may be made thereto without departing from the scope of the invention as set forth in the following claims.

Having thus described our invention, we claim:

1. A photographic self-winding shutter comprising a movable actuating lever providing the opening and closing motion for the shutter blade system of said shutter; a braking weight pivotally mounted on a movable carrier allowing said braking weight to swing out, said braking weight being engaged with said actuating lever so that said engagement can be connected and disconnected.

2. The photographic self-winding shutter of claim 1, wherein said carrier of said braking weight is movably mounted with respect to said actuating lever so that movement of said pivotal mounting of said braking weight on said carrier toward said engagement of said braking weight with said actuating lever causes the swing-out distance of said braking weight to be increased inversely proportional to said movement of said pivotal mounting.

3. The photographic self-winding shutter of claim 1 wherein said actuating lever has a freely movable end carrying a clutch pin, and wherein the portion of said braking weight facing said clutch pin has a rocker arm engageable with said clutch pin.

4. The photographic self-winding shutter of claim 3 wherein said braking weight has a recess configured to the course of motion of said clutch pin and wherein said recess has a straight-lined limiting edge that serves as reflex stop.

5. The photographic self-winding shutter of claim 4, wherein fixed stops are provided for said braking weight to guide said weight and have said weight make snug contact when said weight is in the setting in which said straight-lined limiting edge of said recess is effective as a reflex stop.

6. A photographic self-winding shutter comprising: support means; shutter means on said support means; actuating means engaged with said shutter means for moving said shutter means into open and closed positions; a braking weight having an engaging portion connectable with said actuating means, said braking weight being movably mounted on a movable carrier to allow said braking weight to swing out relative to said carrier.

7. The photographic self-winding shutter of claim 1 wherein said carrier is pivotally mounted on said support means and said braking weight is pivotally mounted on said carrier so that movement of said pivotal mounting of said braking weight on said carrier toward said engaging portion connecting said braking weight with said actuating lever causes the swing-out distance of said braking weight to be increased inversely proportional to said movement of said pivotal mounting.

8. The photographic self-winding shutter of claim 1 wherein said actuating means has a lever with a freely movable end carrying a clutch pin, and wherein said clutch pin is engagingly disposed in a slot formed in said braking weight.

9. The photographic self-winding shutter of claim 8 wherein said braking weight has a recess configured to the movement of said clutch pin, and wherein said recess has an edge portion limiting the movement of said clutch pin.

10. The photographic self-winding shutter of claim 9 wherein a fixed stop is provided to position said braking weight so that said edge portion of said recess acts as a stop for said clutch pin.

11. The photographic self-winding shutter of claim 6 wherein said actuating means has a lever with a movable end carrying a clutch pin, and wherein said engaging portion of said braking weight has a slot with said clutch pin disposed therein, said slot having a recess portion allowing movement of said clutch pin therein without corresponding movement of said braking weight; and wherein said slot has a rocker arm portion extending from said recess portion and engageable with said clutch pin so as to cause movement of said braking weight upon movement of said lever.

References Cited

UNITED STATES PATENTS

| | | | |
|---|---|---|---|
| 1,249,351 | 12/1917 | Dolby | 95—59 |
| 3,033,092 | 5/1962 | Evnisse et al. | 95—59 |

NORTON ANSHER, Primary Examiner

D. B. WEBSTER, Assistant Examiner

U.S. Cl. X.R.

95—59